Patented May 11, 1937

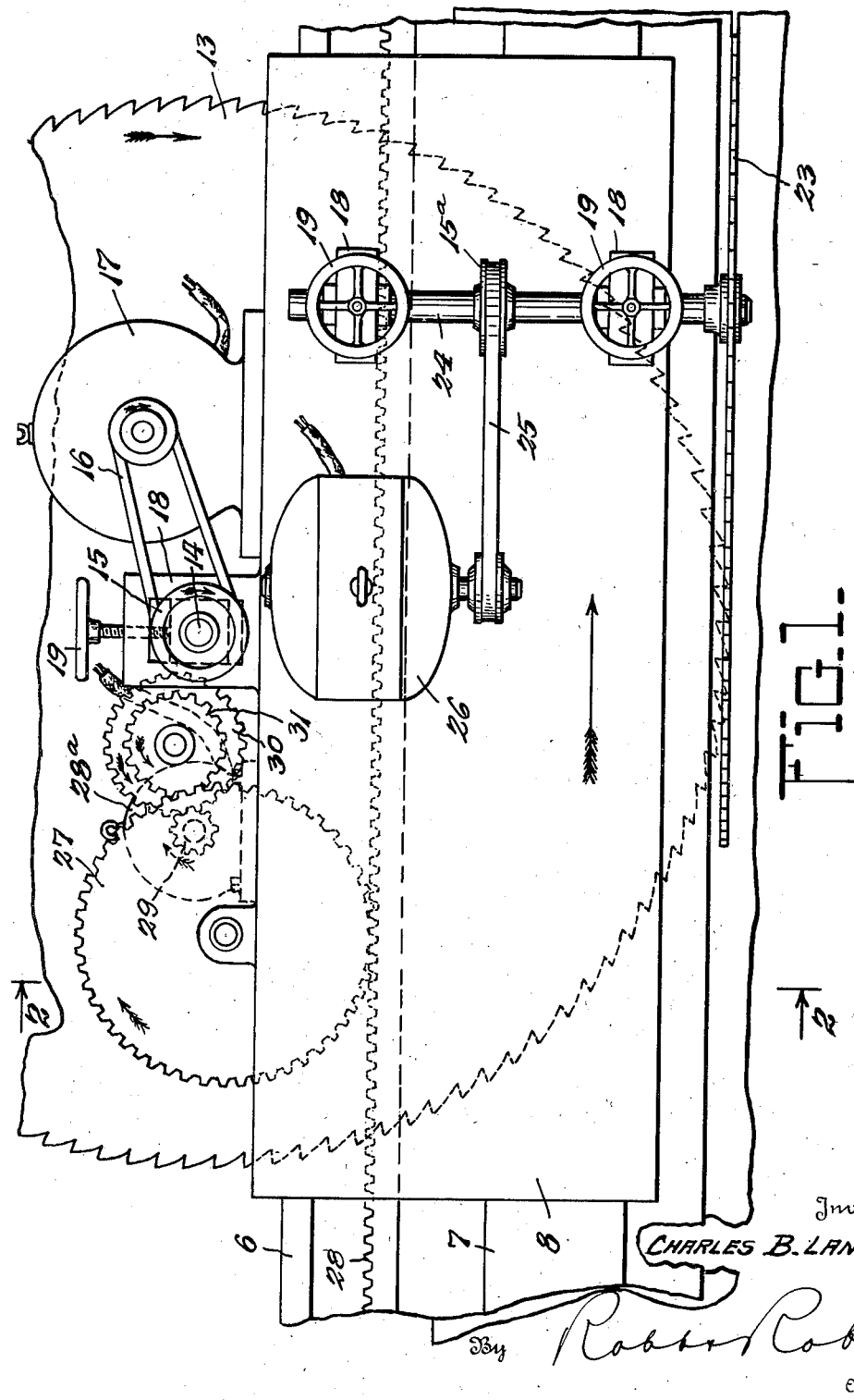

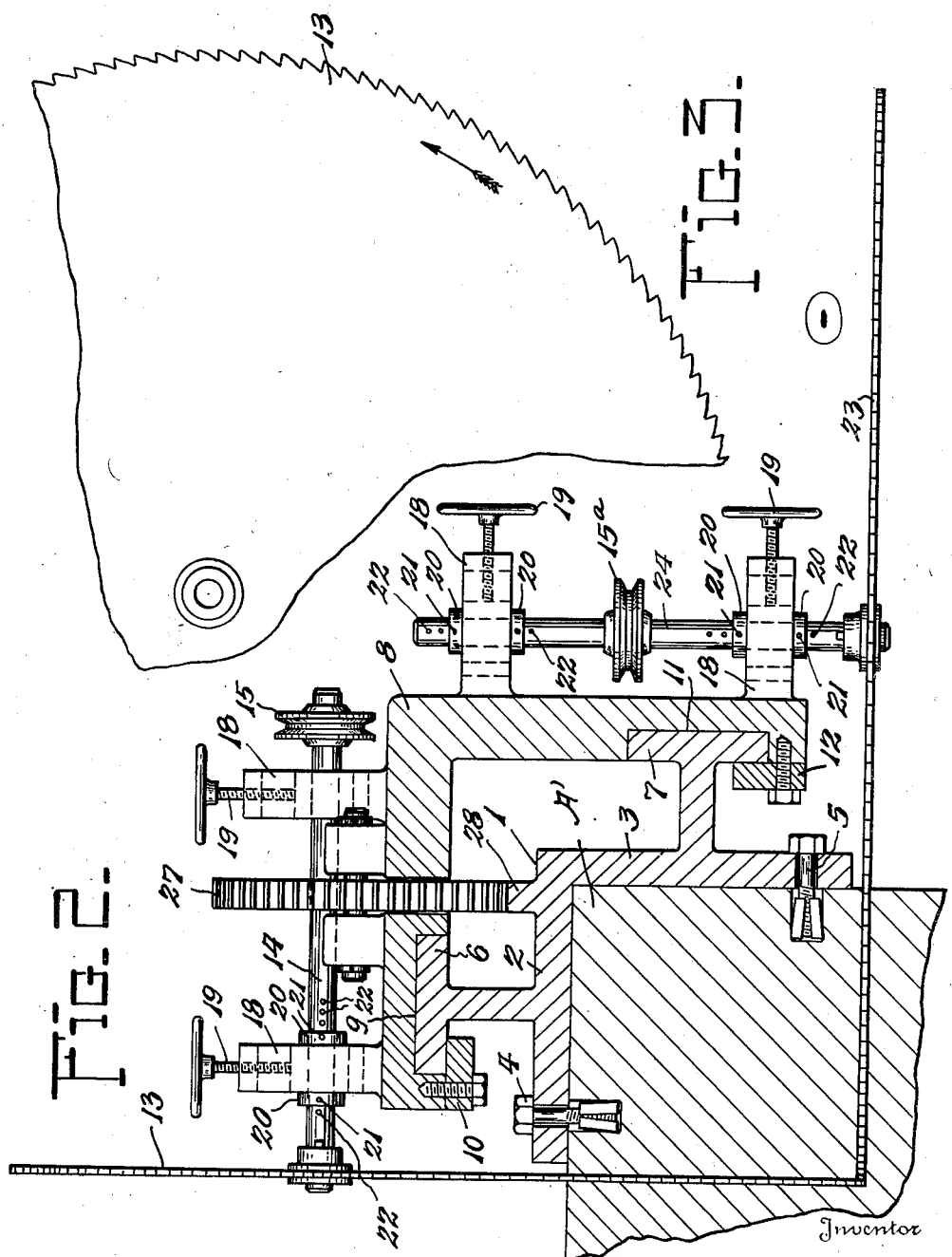

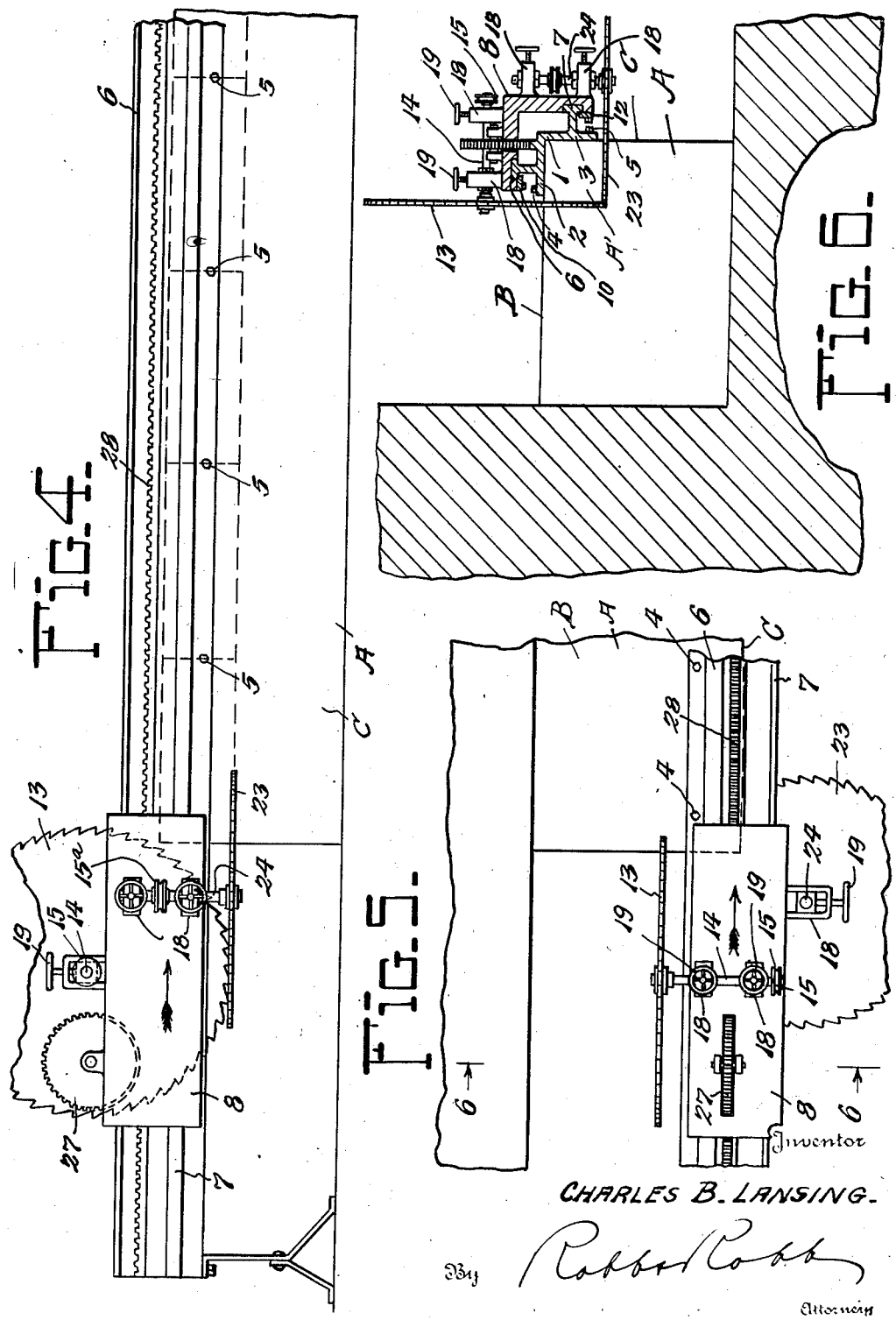

2,079,864

UNITED STATES PATENT OFFICE 2,079,864

STONE QUARRYING MACHINE

Charles B. Lansing, Gates Mills, Ohio

Application August 10, 1936, Serial No. 95,248

8 Claims. (Cl. 125—14)

The present invention embodies an improved machine designed for more efficiently and economically quarrying stone than are the machines at present commonly employed for this purpose in large quarrying operations.

The practically universal method pursued at the present time, for removing and finishing stone in lime-stone and similar quarries, involves the use of a channeling machine by which a vertical cut or channel is formed in the stone being quarried, the depth of the channel or cut depending upon the size of the section of stone which is to be removed. It is customary to drill horizontal holes approximately opposite the bottom, so to speak, of the channel made by the vertical cutters or saws, and then by a system of driving blocks the upper portion of the channel is spread to break off the section of stone approximately on the horizontal line established by the more or less closely spaced horizontal holes above referred to. The foregoing involves a relatively slow operation and the separation of very large sections or blocks of stone which are transported to the site of the machinery employed for finishing the stone after the large section has been cut up into the smaller blocks of a size intended to be used ultimately.

In the above described method of quarrying stone the wastage is very heavy, and additionally, the said wastage is promoted by the necessity for cutting notches in the large stone section broken off for engagement of the grapple means of the crane or derrick used for hoisting the stone section for facilitating its transportation to the final sawing or cutting machinery and for producing the final finishing operations necessary before the stone is ready for commercial use.

It is the purpose of the machine of the present invention to quarry the stone to finished form at the site from which the stone is taken from the quarry, with the especial object in view of eliminating the tremendous wastage incident to the method customarily employed, as hereinbefore set forth. To this end, my machine involves the employment of vertical and horizontal saws or cutters capable of sawing the stone into its finished shapes at the quarry, the machine being mounted directly upon the stone in process of being quarried, so that the finished product or stone slabs for ultimate use are produced directly from the stone deposit without necessitating many of the operations that are entailed at the present time, by the ordinary method of procedure. I am aware that it has been proposed heretofore in the prior art to avail of horizontal or vertical cutters or saws mounted directly at the place of the quarrying operation, but so far as I know, machines heretofore designed for this purpose have not been practical, for which reason I have improved upon the construction of such machines.

In the carrying out of my invention, it is contemplated to remove the over-burden and refuse on the bed of stone, in the usual manner, and produce by horizontal and vertical channeling or cutting operations a substantially accurate horizontal upper surface for the bed of stone, and at least one outer straight face surface to enable the accurate mounting and anchoring of the bed plate or base member that carries the cutting or sawing instrumentalities of my machine. It is further contemplated to provide my bed plate or anchored base member for my machine in angular form to conform with the straight surfaces of the preliminarily prepared stone bed of the quarry, and in this way, accurately position my machine with its cutting instrumentalities for action on the stone in producing the finished quarrying operations contemplated in the operation of my machine.

Additionally, it is proposed by my invention to provide on the anchored base plate of my machine rigidly connected track members disposed horizontally for guiding the cutting mechanism, and also disposed vertically for the same purpose, the horizontal track means and vertical track means being adapted to guide the saw or cutter frame or carriage upon which are mounted the horizontal and the vertical cutting devices which in action cooperate to cut a finished block of stone from the bed of stone which has been preliminarily prepared with relatively accurate horizontal and vertical faces, ready to be quarried into the finished shapes.

By reason of the employment of the accurately positioned angular bed plate or member of my machine with the correspondingly rigidly and accurately positioned trackage devices for guiding the carriage that supports the vertical and horizontal saws, the said saws are not only accurately, but rigidly supported in their operating positions, against undue vibration, notwithstanding that suitable instrumentalities are utilized to permit variation in the adjustment of these saws relatively to the bed of stone being operated on.

In the above manner I do away with any possibility of permitting undue vibration and consequent inaccurate action of the cutting mechanism.

Additional to the foregoing features of my invention, I provide positive driving means for the saw carriage or frame, whereby to move the same steadily and accurately upon the track members which hold and guide said saw carriage or frame as it is shifted to carry on the cutting operation lengthwise of the bed of stone which is being quarried into the finished shapes. The positive driving means, resorted to by me, may take different forms though rack and gear devices are illustrated in the drawings appended hereto, as one method of construction useful for the purposes of the invention. However, there may be substituted for such means, screw propelling devices or power driven cable-pulling mechanism for performing the desired positive driving action.

In view of the foregoing, it will be understood that I do not wish to be limited to the exact instrumentalities incorporated in my machine so far as the precise construction and arrangement thereof, as presented in my accompanying drawings, are concerned, as these may be modified considerably within the purview of my invention, so long as the essential features of the base member, rigid track members, and positive driving features are retained and used in substantially the combination herein presented.

In the accompanying drawings:—

Figure 1 is a fragmentary view in side elevation of a machine embodying my invention, illustrating the principle of its construction and the main features relied upon to render the said machine practical for its purposes.

Figure 2 is a sectional view showing the same parts as Figure 1, with certain driving members omitted, but looking at the machine from a direction at right angles to the view of Figure 1.

Figure 3 is a fragmentary view of one of the cutting members which is in the form of a saw.

Figure 4 is a side view of the machine showing more clearly the positive driving pinion and rack feature for advancing the machine to its work, certain of the driving motors and connections being omitted for purposes of clearness.

Figure 5 is a top plan view showing more particularly the features illustrated in Figure 4.

Figure 6 is a sectional view showing the manner in which the quarrying machine of the invention is mounted upon a preliminarily prepared bed of stone, ready for the operation of cutting finished stone shapes therefrom.

Reference will first be made to Figure 6 of the drawings, wherein there is shown a section of bed stone, designated A, ready to be quarried by the machine of the invention, the said section having been cut horizontally to provide the straight upper face and also cut vertically to provide the outer straight face C. So prepared, the stone A of the quarry is ready for the application of the machine of the invention so that finished quarrying operations to produce final shapes may be made.

The machine of the invention is placed in the general position illustrated in Figure 6 and in Figure 2 so that the supporting or bed plate 1, comprising the upper horizontal member 2 and the outer vertical member 3 may be accurately disposed on the corner section A' of the bed stone, as seen in Figures 6 and 2. The angularly arranged members 2 and 3 of the bed plate 1 should fit snugly the corner section A' of the bed stone to be quarried and will be anchored in position thereon by means of anchoring bolts of the expansion type preferably, designated 4 and 5, these bolts being located as close to the line of vertical cut and the line of horizontal cut, as possible. Carried by the horizontal member 2 of the bed plate is the horizontal track 6 which is preferably in the form of a T-section, the top of which constitutes the track or rail proper, and carried by the vertical member 3 is a similar track member 7 connected with the member 3 in the same manner as the member 6 is connected with the member 2.

The cutter mechanism comprises the shiftable carriage or cutter frame 8, which is preferably of angular formation so as to comprise horizontal and vertical portions parallel with the horizontal and vertical portions of the bed plate 1, respectively, and similarly parallel respectively with the horizontal track member 6 and the vertical track member 7. The carriage 8 will carry the sawing or cutting devices and the horizontal portion of the carriage has a guide groove 9 to receive the track or rail member 6 which is held in the groove by means of the detachable bolted plate 10 applied to the under side of the horizontal portion of the carriage. In like manner, the vertical portion of the carriage 8 is equipped with a groove 11 in the inner side thereof, receiving the track member 7 that is held in place on the carriage 8 by means of the detachable bolted plate 12.

The upper portion of the carriage 8 supports the vertical cutter or saw 13 mounted upon its driving shaft 14 having the driven pulley 15 operated by a belt 16 suitably connected with any convenient motor driving means such as 17, an electric motor being illustrated. The shaft 14 is mounted in bearings provided in vertical standards 18 on the upper portion of the carriage 8 and the said bearings are vertically adjustable by means of screws 19 or any equivalent devices. By means of the screws 19, vertical adjustment of the saw or cutter 13 may be perfected, in an obvious manner. Slight horizontal adjustment of the driving shaft 14 may be effected by means of collars 20 at opposite sides of one of the standards 18, with pins 21 adapted to pass through the said collars and selected ones of openings 22 in the shaft 14. The adjustment of the shaft 14 longitudinally will compensate for wear on the cutting device and will permit of some range of variation in the size of the cut of the finished shape or slab that is to be produced by the machine.

It is contemplated that other means may be resorted to to provide for horizontal adjustment of the shaft 14, to give as great a desired range of such adjustment as may be required.

Now in respect to the vertical portion of the carriage 8, it is notable that a horizontal cutter or saw 23 is supported thereon in substantially the same way as the vertical cutter or saw 13 is mounted upon the horizontal portion of the carriage, and those parts used for the mounting of the drive shaft 24, of said cutter or saw 23, which are the same as previously described in reference to the shaft 14, are designated by the same number. However, in relation to the driving shaft 24, there is provided the driven pulley 15a located centrally of the shaft 24 instead of at the end as is the arrangement for the driving pulley 15 of the shaft 14.

The pulley 15a is operated by a belt 25, connecting a motor 26 with said pulley.

The cutters or saws 13 and 23 will be located so that the driving axes thereof are offset sufficiently that the teeth of the said saws will produce cuts intersecting one another, but the teeth will not interengage under such conditions. In this way, a clean complete angular cut of the finished shape A' separating it from the bed stone A may be produced.

Mounted upon the horizontal portion of the carriage 8 is the driving pinion or gear 27 forming a part of the positive driving means for advancing the cutting mechanism of the machine to its work. The said gear 27 has its teeth in mesh with the teeth of a rack 28.

The rack 28 is relatively long, and if desired, may be made in sections corresponding with the length of the sections of the base plate 1 of which it forms a part, it being understood that the base plate 1 and the track members 6 and 7 carried thereby will preferably be of sectional construction so that any length of support or plate 1 may be provided dependent upon the length of the prepared bed stone section A which is to be quarried into the finished shapes directly by my machine.

For driving the carriage travel gear 27, a motor 28a, see Figure 1, may be provided, the drive shaft of said motor being connected by reduction gears 29, 30, and 31, with the gear 27, whereby to compel slow positive movement of the carriage 8 in advancing same and the cutting mechanism carried thereby, to the work.

The operation of my machine will be clear from the foregoing, since it involves merely the driving of the cutters 13 and 23, once the machine is emplaced in the position illustrated by Figure 2 and Figure 6, and the simultaneous driving of the travel gear 27, which positively moves the carriage 8 in causing the cutters or saws 13 and 23 to advance to their work.

By reason of the rigid connection of the track members 6 and 7, and the provision of the rigid angularly shaped carriage 8, it will be seen that the axes of the cutters or saws 13 and 23 are accurately and rigidly positioned in their right angular relationship, and there is possible no vibration, of the saws which might lead to inaccuracy of the cutting operations performed thereby.

Moreover, the cutting mechanism is positively advanced always to its work by the driving action of the gear 27 which positively interengages the rack 28, though positive screw driving or cable driving instrumentalities may be substituted for such positive advancing means.

In the event that the prepared stone bed does not have sufficiently straight and accurate faces, shims and wedges could be used under the bed plate of my proposed machine to accurately position said machine.

Having thus described my invention, what I claim as new and desire to secure by Letters Patent of the United States, is:—

1. In a stone quarrying machine, in combination, a bed plate comprising rigidly connected horizontal and vertical members, a track member offstanding from each of the horizontal and vertical members of the bed plate, a carriage comprising rigidly connected horizontal and vertical members disposed adjacent to the corresponding members of the bed plate respectively, and mounted for movement on the said track members of the bed plate, a vertical cutter carried by the horizontal member of the carriage, a horizontal cutter carried by the vertical member of the carriage, and means for effecting travel movement of the carriage on the bed plate.

2. A machine as claimed in claim 1, wherein the last means comprises positive driving mechanism intermediate the carriage and the bed plate for effecting the travel movement of the carriage relatively to the bed plate.

3. A machine as claimed in claim 1, wherein the last means comprises mechanism for positively moving the carriage relatively to the bed plate to effect advance of the cutters to the work.

4. In a stone quarrying machine, in combination, a bed plate comprising a horizontal member and a vertical member connected thereto, a track member on the horizontal member of the bed plate, a track member on the vertical member of the bed plate, a carriage slidably mounted on said track members of the bed plate, and vertical and horizontal cutting members carried by the carriage and adapted to be fed to work thereby.

5. A machine as set forth in claim 4, wherein the carriage comprises rigidly connected horizontal and vertical members, the horizontal member sliding on the vertical track member aforesaid, and the vertical member sliding on the horizontal track member aforesaid.

6. A machine as set forth in claim 4, comprising positive driving means for moving the carriage relatively to the bed plate, the same combined with the carriage and bed plate parts.

7. A machine as set forth in claim 4, in which the vertical track member has sliding interlocking engagement with the horizontal member of the carriage, and in which the horizontal track member has sliding interlocking connection with the vertical member of the carriage.

8. In a stone quarrying machine, in combination, a bed plate comprising angularly disposed rigidly connected members, a carriage comprising angularly disposed rigidly connected members parallel with those of the bed plate, rigid track members on the angularly disposed members of the bed plate and having interlocking sliding connection with the rigid angularly disposed members of the carriage, cutting mechanism on the carriage comprising a vertical cutter axially and radially adjustable on one of the angularly disposed members of the carriage, and a horizontal cutter axially and radially adjustable on the other angularly disposed member of the carriage, and positive driving gear mechanism intermediate the carriage and the bed plate for causing travel movement of the carriage and feeding of the cutters to their work.

CHARLES B. LANSING.